(12) United States Patent
Fukui

(10) Patent No.: US 12,428,018 B2
(45) Date of Patent: Sep. 30, 2025

(54) VEHICLE CONTROL APPARATUS

(71) Applicant: TOYOTA JIDOSHA KABUSHIKI KAISHA, Toyota (JP)

(72) Inventor: Yusuke Fukui, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 18/675,562

(22) Filed: May 28, 2024

(65) Prior Publication Data

US 2025/0010874 A1 Jan. 9, 2025

(30) Foreign Application Priority Data

Jul. 7, 2023 (JP) ................................ 2023-111909

(51) Int. Cl.
| | |
|---|---|
| *B60W 50/14* | (2020.01) |
| *B60W 10/20* | (2006.01) |
| *B60W 30/095* | (2012.01) |
| *B60W 30/12* | (2020.01) |
| *B60W 50/00* | (2006.01) |

(52) U.S. Cl.
CPC ............ *B60W 50/14* (2013.01); *B60W 10/20* (2013.01); *B60W 30/0956* (2013.01); *B60W 30/12* (2013.01); *B60W 50/0097* (2013.01); *B60W 2050/143* (2013.01); *B60W 2050/146* (2013.01); *B60W 2554/4045* (2020.02)

(58) Field of Classification Search
CPC .. B60W 50/14; B60W 10/20; B60W 30/0956; B60W 30/12; B60W 50/0097; B60W 2554/4045; B60W 2050/143; B60W 2050/146

USPC ........................................................ 340/425.5
See application file for complete search history.

(56) References Cited

U.S. PATENT DOCUMENTS

| | | | |
|---|---|---|---|
| 9,105,190 B2 | 8/2015 | Akiyama | |
| 9,393,960 B2 | 7/2016 | Kodaira | |
| 9,483,945 B2 | 11/2016 | Okita et al. | |
| 9,873,412 B2 | 1/2018 | Moriizumi | |
| 10,793,147 B2 | 10/2020 | Kaminade et al. | |
| 11,618,322 B2 * | 4/2023 | Yu .......................... | B60K 35/22 340/901 |
| 2010/0191421 A1 * | 7/2010 | Nilsson .................. | B62D 6/003 701/41 |

(Continued)

FOREIGN PATENT DOCUMENTS

JP 2014-085805 A 5/2014

*Primary Examiner* — Kerri L Mcnally
(74) *Attorney, Agent, or Firm* — Oliff PLC

(57) ABSTRACT

A vehicle control apparatus performs an alert notification of alerting an operator of at least one of an own vehicle and an oncoming vehicle of a collision probability. The vehicle control apparatus performs the alert notification when a predicted lane departure period of time is equal to or longer than a second threshold period of time at a point of time when a predicted collision period of time becomes shorter than a first threshold period of time, and performs the alert notification when the predicted lane departure period of time becomes shorter than a third threshold period of time shorter than the second threshold period of time in case that the predicted lane departure period of time is shorter than the second threshold period of time at a point of time when the predicted collision period of time becomes shorter than the first threshold period of time.

3 Claims, 3 Drawing Sheets

(56) References Cited

U.S. PATENT DOCUMENTS

| | | |
|---|---|---|
| 2019/0389470 A1* | 12/2019 | Zarringhalam ........ B62D 6/008 |
| 2021/0061309 A1 | 3/2021 | Kawanai |
| 2021/0107521 A1* | 4/2021 | Fujita .................... B60W 40/09 |
| 2021/0107528 A1 | 4/2021 | Fujita et al. |
| 2021/0146956 A1 | 5/2021 | Fujita et al. |
| 2021/0146958 A1 | 5/2021 | Tanaka et al. |
| 2022/0314974 A1* | 10/2022 | Kakeshita ............. B60W 50/10 |
| 2023/0399004 A1* | 12/2023 | Lee ...................... G08G 1/0962 |

\* cited by examiner

VEHICLE CONTROL APPARATUS

CROSS-REFERENCE TO RELATED APPLICATIONS

This application claims priority to Japanese patent application No. JP 2023-111909 filed on Jul. 7, 2023, the content of which is hereby incorporated by reference in its entirety.

BACKGROUND

Field

The present invention relates to a vehicle control apparatus.

Description of the Related Art

There is known a vehicle control apparatus which performs an alert notification to an operator of an own vehicle when a probability of the own vehicle departing from a traffic lane increases to a certain level, and a probability of the own vehicle colliding with an oncoming vehicle increases to a certain level (for example refer to JP 2014-085805 A). The alert notification is a notification of alerting the operator of a collision probability of the own vehicle colliding with the oncoming vehicle.

When a period of time predictively taken for the own vehicle to depart from the traffic lane and collide with the oncoming vehicle decreases to a certain period of time, there is occurred a case that the own vehicle may be determined to depart from the traffic lane and collide with the oncoming vehicle. In this case, when (i) a period of time taken for the own vehicle to depart from the traffic lane is relatively long, and (ii) a period of time taken for the own vehicle to collide with the oncoming vehicle since the own vehicle departs from the traffic lane is relatively long, the operator of the own vehicle or an operator of the oncoming vehicle can easily carry out a suitable driving operation for avoiding a collision of the own vehicle with the oncoming vehicle. Therefore, in this case, the alert notification to the operator of the own vehicle or the oncoming vehicle is not necessary.

Therefore, as in the known vehicle control apparatus, when the alert notification is always performed in response to the increased probability of the own vehicle departing from the traffic lane and the increased probability of the own vehicle colliding with the oncoming vehicle.

SUMMARY

An object of the present invention is to provide a vehicle control apparatus which can perform an appropriate alert notification when the own vehicle has a probability of departing from the traffic lane and colliding with the oncoming vehicle.

A vehicle control apparatus according to the present invention comprises an electronic control unit configured to perform an alert notification of alerting an operator of at least one of an own vehicle and an oncoming vehicle of a probability that the own vehicle collides with the oncoming vehicle when the electronic control unit determines that the own vehicle has a probability of colliding with the oncoming vehicle based on a predicted travelling route of the own vehicle and a predicted travelling route of the oncoming vehicle. The electronic control unit is configured to perform the alert notification when a predicted lane departure period of time is equal to or longer than a second threshold period of time at a point of time when a predicted collision period of time becomes shorter than a first threshold period of time. The predicted collision period of time is a period of time taken for the own vehicle to collide with the oncoming vehicle, and the predicted lane departure period of time is a period of time taken for the own vehicle to depart from a traffic lane. Further, the electronic control unit is configured to perform the alert notification when the predicted lane departure period of time becomes shorter than a third threshold period of time shorter than the second threshold period of time in case that the predicted lane departure period of time is shorter than the second threshold period of time at a point of time when the predicted collision period of time becomes shorter than the first threshold period of time.

When the period of time predictively taken for the own vehicle to depart from the traffic lane and collide with the oncoming vehicle decreases to a certain period of time, there may be occurred a case that the own vehicle is determined to depart from the traffic lane and collide with the oncoming vehicle. In this case, when (i) the period of time taken for the own vehicle to depart from the traffic lane is relatively long, and (ii) a period of time taken for the own vehicle to collide with the oncoming vehicle since the own vehicle departs from the traffic lane is relatively long, the operator of the own vehicle or the oncoming vehicle can easily carry out a suitable driving operation for avoiding a collision of the own vehicle with the oncoming vehicle. Therefore, in this case, the alert notification to the operator of the own vehicle or the oncoming vehicle is not necessary.

On the other hand, when the period of time taken for the own vehicle to collide with the oncoming vehicle since the own vehicle departs from the traffic lane is short, the alert notification should be performed to the operator of the own vehicle or the oncoming vehicle. Also, when the period of time taken for the own vehicle to depart from the traffic lane is short, the alert notification should be performed to the operator of the own vehicle or the oncoming vehicle.

With the vehicle control apparatus according to the present invention, the alert notification is performed when the predicted traffic lane departure period of time is equal to or longer than the second threshold period of time at a point of time when the predicted collision period of time becomes smaller than the first threshold period of time. That is, the alert notification is performed when the period of time taken for the own vehicle to collide with the oncoming vehicle is short at a point of time when the period of time taken for the own vehicle to collide with the oncoming vehicle decreases to a certain period of time. Thereby, the alert notification is performed appropriately.

Further, with the vehicle control apparatus according to the present invention, the alert notification is performed when the predicted lane departure period of time becomes shorter than the third threshold period of time in case that the predicted traffic lane departure period of time is equal to or longer than the third threshold period of time at a point of time when the predicted collision period of time becomes shorter than the first threshold period of time. That is, the alert notification is performed when the period of time taken for the own vehicle to depart from the traffic lane is short at a point of time when the period of time taken for the own vehicle to collide with the oncoming vehicle decreases to a certain period of time. Thereby, the alert notification is performed appropriately.

In the vehicle control apparatus according to an aspect of the present invention, the electronic control unit may be configured not to perform the alert notification when (i) the predicted collision period of time is shorter than the first threshold period of time, and (ii) the predicted lane departure period of time is shorter than the second threshold period of time and equal to or longer than the third threshold period of time.

When the period of time predictively taken for the own vehicle to depart from the traffic lane and collide with the oncoming vehicle decreases to a certain period of time, there may be occurred a case that the own vehicle is determined to depart from the traffic lane and collide with the oncoming vehicle. In this case, when (i) the period of time taken for the own vehicle to depart from the traffic lane is relatively long, and (ii) the period of time taken for the own vehicle to collide with the oncoming vehicle since the own vehicle departs from the traffic lane is relatively long, the operator of the own vehicle or the oncoming vehicle can easily carry out a suitable driving operation for avoiding the collision of the own vehicle with the oncoming vehicle. Therefore, in this case, the alert notification to the operator of the own vehicle or the oncoming vehicle is not necessary.

With the vehicle control apparatus according to this aspect of the present invention, when (i) the predicted collision period of time is shorter than the first threshold period of time, and (ii) the predicted lane departure period of time is shorter than the second threshold period of time and equal to or longer than the third threshold period of time, the alert notification is not performed. That is, when the period of time taken for the own vehicle to collide with the oncoming vehicle decreases to a certain period of time, there may be occurred a case that (i) the period of time taken for the own vehicle to depart from the traffic lane is relatively long, and (ii) the period of time taken for the own vehicle to collide with the oncoming vehicle since the own vehicle departs from the traffic lane is short. In this case, the alert notification not is performed as far as the period of time taken for the own vehicle to depart from the traffic lane is not extremely short. Thus, the unnecessary alert notification can be prevented from being performed.

In the vehicle control apparatus according to another aspect of the present invention, the electronic control unit may be configured to perform an automatic steering of returning the own vehicle into the traffic lane by automatically steering the own vehicle when the own vehicle departs from the traffic lane after the electronic control units starts performing the alert notification.

With the vehicle control apparatus according to this aspect of the invention, the own vehicle can be automatically returned into the original traffic lane.

Elements of the invention are not limited to elements of embodiments and modified examples of the invention described with reference to the drawings. The other objects, features and accompanied advantages of the invention can be easily understood from the embodiments and the modified examples of the invention.

DETAILED DESCRIPTION

Figure 1:
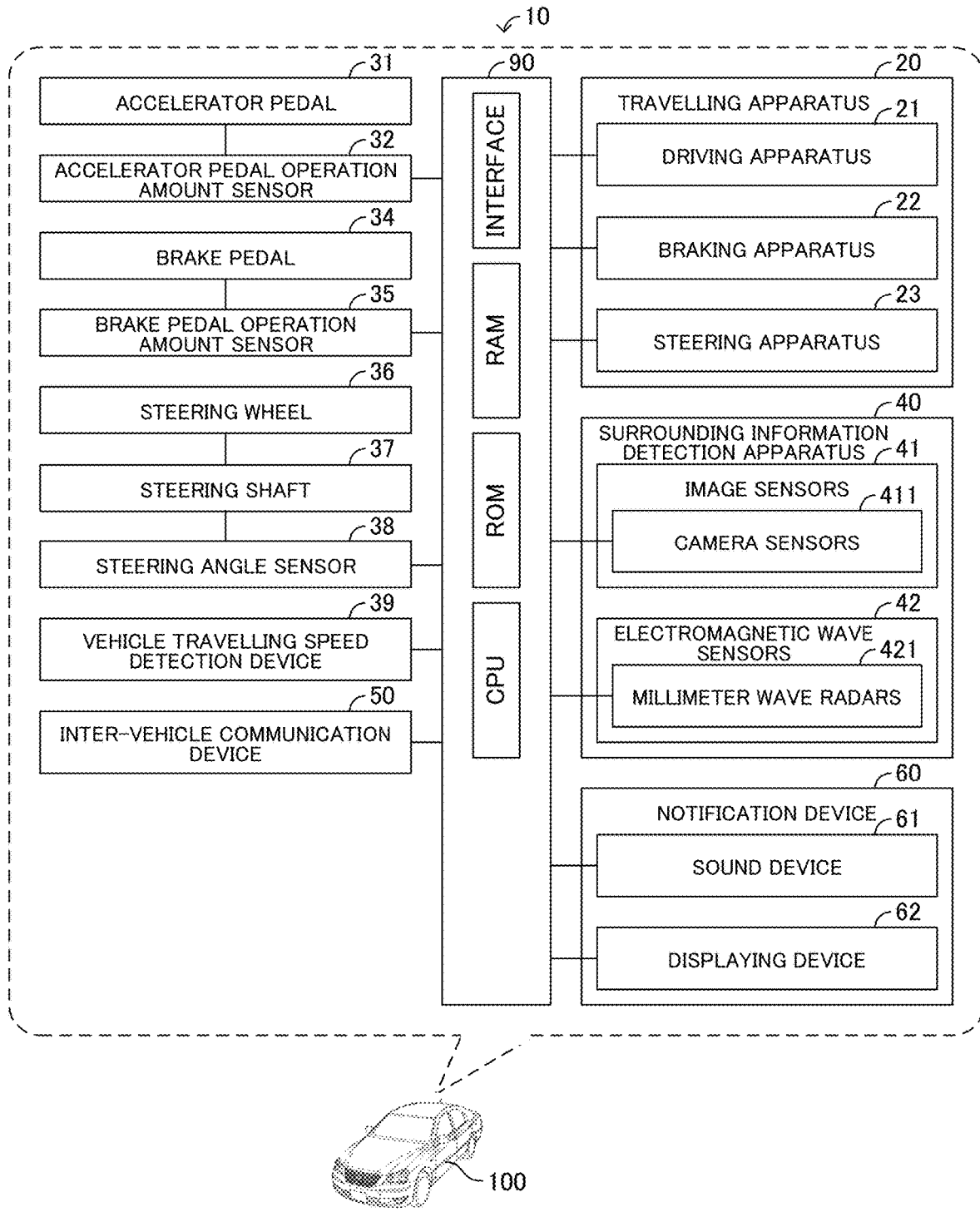
FIG. 1 is a view which shows a vehicle control apparatus according to an embodiment of the present invention.

Below, a vehicle control apparatus according to an embodiment of the present invention will be described with reference to the drawings. FIG. 1 shows the vehicle control apparatus 10 according to the embodiment of the present invention. The vehicle control apparatus 10 is mounted on an own vehicle 100. Hereinafter, the vehicle control apparatus 10 will be described by taking as an example a case where an operator of the own vehicle 100 is a driver of the own vehicle 100, that is, a person who is in the own vehicle 100 and drives the own vehicle 100. Similarly, the vehicle control apparatus 10 will be described by taking as an example a case where an operator of an oncoming vehicle 200 is a driver of the oncoming vehicle 200, that is, a person who is in the oncoming vehicle 200 and drives the oncoming vehicle 200.

However, the operator of the own vehicle 100 may be a remote operator of the own vehicle 100, that is, an operator who is not in the own vehicle 100 but remotely drives the own vehicle 100. When the operator of the own vehicle 100 is the remote operator, the vehicle control apparatus 10 is mounted on the own vehicle 100 and a remote operation facility installed outside the own vehicle 100 for remotely driving the own vehicle 100, and functions of the vehicle control apparatus 10 described below are realized by the vehicle control apparatus 10 mounted on the own vehicle 100 and the vehicle control apparatus 10 mounted on the remote operation facility. Similarly, the operator of the oncoming vehicle 200 may be a remote operator of the oncoming vehicle 200, that is, a person who is not in the oncoming vehicle 200 but remotely drives the oncoming vehicle 200.

As shown in FIG. 1, the vehicle control apparatus 10 includes an ECU (electronic control device) 90 as a control device. The ECU 90 includes a microcomputer as a main component. The microcomputer includes a CPU, a storage medium such as ROM, RAM and a non-volatile memory, an interface, and the like. The CPU is configured or programmed to realize various functions by executing instructions, programs, or routines stored in the storage medium. In particular, in the present embodiment, the vehicle control apparatus 10 stores, in the storage medium, programs for realizing various kinds of controls executed by the vehicle control apparatus 10.

In the present embodiment, the vehicle control apparatus 10 includes only one ECU 90, but may include a plurality of ECUs, and may be configured to share the functions of the vehicle control apparatus 10 described below by the respective ECU.

Further, the vehicle control apparatus 10 may be configured to be able to update the programs stored in the storage medium by wireless communication (for example, Internet communication) with external devices.

The own vehicle 100 is equipped with a traveling apparatus 20. The traveling apparatus 20 includes a driving apparatus 21, a braking apparatus 22, and a steering apparatus 23.

The driving apparatus 21 is an apparatus which outputs a driving force (or a driving torque) applied to the own vehicle 100 for travelling the own vehicle 100, and includes, for example, an internal combustion engine, at least one electric motor, or the like. The driving apparatus 21 is electrically connected to the ECU 90. The vehicle control apparatus 10 controls the driving force output from the driving apparatus 21 by controlling operations of the driving apparatus 21.

The braking apparatus 22 is an apparatus which outputs a braking force (or a braking torque) applied to the own vehicle 100 for braking the own vehicle 100, and includes, for example, a hydraulic braking device. The braking apparatus 22 is electrically connected to the ECU 90. The vehicle control apparatus 10 controls the braking device force output from the braking apparatus 22 by controlling operations of the braking apparatus 22.

The steering apparatus 23 is an apparatus which outputs a steering force (or a steering torque) applied to the own vehicle 100 for steering the own vehicle 100, and includes, for example, a power steering device. The steering apparatus 23 is electrically connected to the ECU 90. The vehicle control apparatus 10 controls the steering force output from the steering apparatus 23 by controlling operations of the steering apparatus 23.

Further, the own vehicle 100 is equipped with an accelerator pedal 31, an accelerator pedal operation amount sensor 32, a brake pedal 34, a brake pedal operation amount sensor 35, a steering wheel 36, a steering shaft 37, a steering angle sensor 38, a vehicle travelling speed detection device 39, a surrounding information detection apparatus 40, an inter-vehicle communication device 50, and a notification device 60.

The accelerator pedal operation amount sensor 32 is a sensor which detects an operation amount of the accelerator pedal 31 and is electrically connected to the ECU 90. The vehicle control apparatus 10 acquires the operation amount of the accelerator pedal 31 as an accelerator pedal operation amount AP by the accelerator pedal operation amount sensor 32. The vehicle control apparatus 10 acquires a required driving force (or a required driving torque) based on the accelerator pedal operation amount AP and a traveling speed of the own vehicle 100, and controls the operations of the driving apparatus 21 such that the driving force corresponding to the required driving force is applied from the driving apparatus 21 to the own vehicle 100.

The brake pedal operation amount sensor 35 is a sensor which detects an operation amount of the brake pedal 34 and is electrically connected to the ECU 90. The vehicle control apparatus 10 acquires the operation amount of the brake pedal 34 as a brake pedal operation amount BP by the brake pedal operation amount sensor 35. The vehicle control apparatus 10 acquires a required braking force (or a required braking torque) based on the brake pedal operation amount BP, and controls the operations of the braking apparatus 22 such that the braking force corresponding to the required braking force is applied to the own vehicle 100 from the braking apparatus 22.

The steering angle sensor 38 is a sensor which detects a rotational angle of the steering shaft 37 with respect to its neutral position, and is electrically connected to the ECU 90. The vehicle control apparatus 10 acquires the rotational angle of the steering shaft 37 as a steering angle θ by the steering angle sensor 38.

The vehicle control apparatus 10 acquires a required steering force (or a required steering torque) based on the steering angle θ and the traveling speed of the own vehicle 100, and controls the operations of the steering apparatus 23 such that the steering force corresponding to the required steering force is applied from the steering apparatus 23 to the own vehicle 100.

The vehicle travelling speed detection device 39 is a device which detects the traveling speed of the own vehicle 100, and includes, for example, wheel rotation speed sensors. The vehicle travelling speed detection device 39 is electrically connected to the ECU 90. The vehicle control apparatus 10 acquires the traveling speed of the own vehicle 100 as an own vehicle travelling speed V by the vehicle travelling speed detection device 39.

The surrounding information detection apparatus 40 is an apparatus which detects information on situations around the own vehicle 100. In the present embodiment, the surrounding information detection apparatus 40 includes image sensors 41 and electromagnetic wave sensors 42. The image sensor 41 is a sensor which captures an image of a view around the own vehicle 100 and acquires image data, and in the present embodiment, is a camera sensor 411. In addition, the electromagnetic wave sensor 42 is a sensor which acquires object information on objects around the own vehicle 100, and in the present embodiment, is a millimeter wave radar 421.

The camera sensors 411 and the millimeter wave radars 421 are electrically connected to the ECU 90. The vehicle control apparatus 10 acquires image information on the view around the own vehicle 100 by the camera sensors 411 as surrounding detection information IS, and acquires object information on the object around the own vehicle 100 by the millimeter wave radars 421 as the surrounding detection information IS.

The inter-vehicle communication device 50 is a device which performs wireless communication with other vehicles around the own vehicle 100. The inter-vehicle communication device 50 is electrically connected to the ECU 90. The vehicle control apparatus 10 wirelessly communicates with other vehicles around the own vehicle 100 by the inter-vehicle communication device 50.

The notification device 60 is a device which performs various notifications to the driver of the own vehicle 100. In the present embodiment, the notification device 60 includes a sound device 61 and a displaying device 62.

The sound device 61 is a device which outputs alarm sounds or announcements, and includes, for example, a buzzer or a speaker. The sound device 61 is electrically connected to the ECU 90. The vehicle control apparatus 10 outputs various alarm sounds or various announcements from the sound device 61.

The displaying device 62 is a device which displays images, and includes, for example, a display. The displaying device 62 is electrically connected to the ECU 90. The vehicle control apparatus 10 displays various images by the displaying device 62.

<Operations of Vehicle Control Apparatus>

Next, operations of the vehicle control apparatus 10 will be described. In a scene where the vehicle control apparatus 10 determines that there is no probability of the own vehicle 100 colliding with the oncoming vehicle 200, the vehicle control apparatus 10 performs an alert notification when a period of time taken for the own vehicle 100 to depart from a traffic lane becomes shorter than a predetermined period of time.

The alert notification here is a notification for alerting the driver of the own vehicle 100 of a probability of the own vehicle 100 departing from the traffic lane. The vehicle control apparatus 10 performs the alert notification to the driver of the own vehicle 100 by outputting the alert sound or the alert announcement from the sound device 61 or displaying an alert image by the displaying device 62.

The vehicle control apparatus 10 is configured to perform an automatic steering of automatically steering the own vehicle 100 to return the own vehicle 100 to an original traffic lane when the own vehicle 100 departs from the traffic lane after the vehicle control apparatus 10 starts performing the alert notification. Therefore, the automatic steering is a kind of automatic driving.

Figure 2:
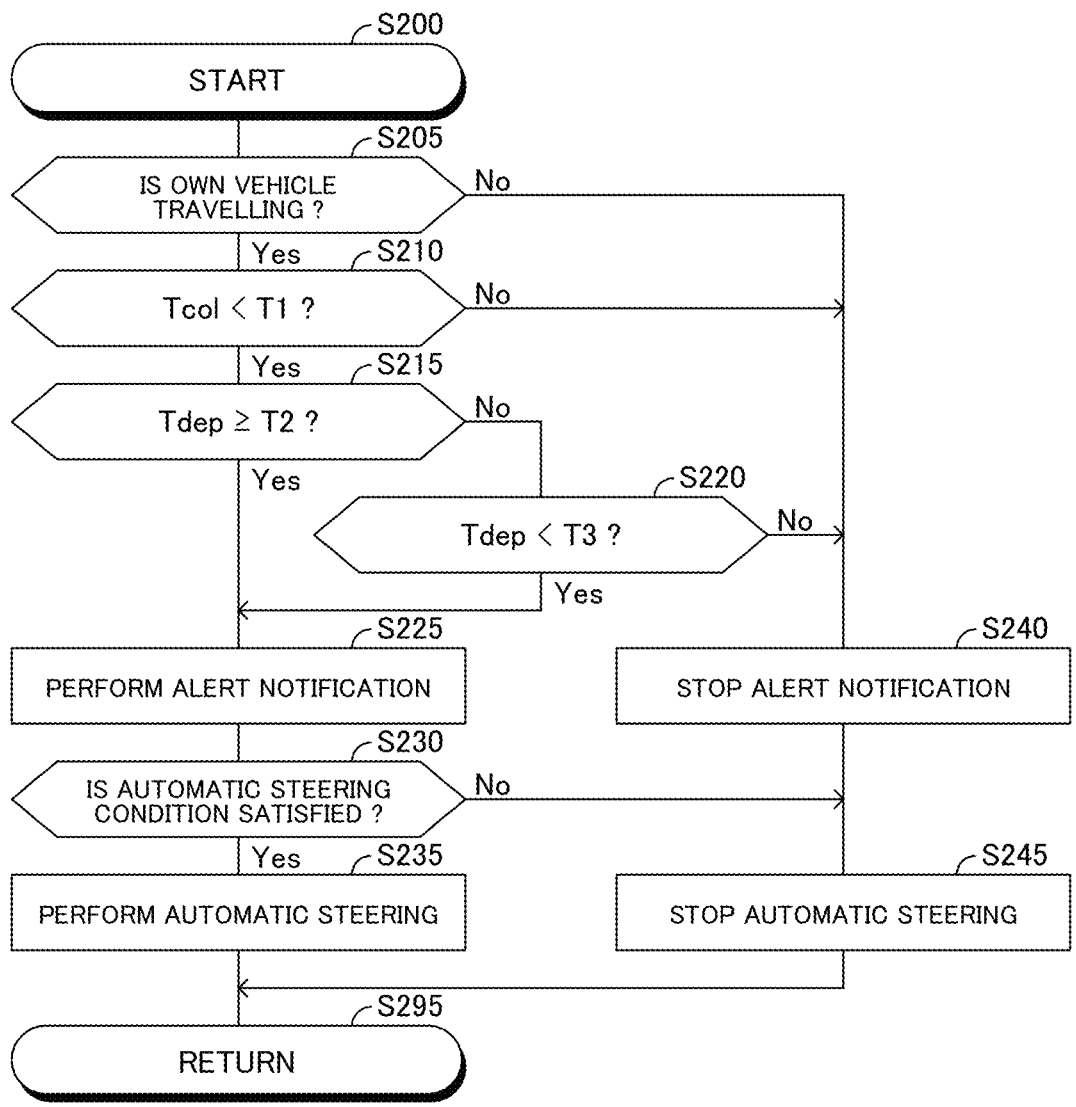
FIG. 2 is a view which shows a flowchart of a routine executed by the vehicle control apparatus according to the embodiment of the present invention.

Further, the vehicle control apparatus 10 is configured to execute a routine shown in FIG. 2 at a predetermined calculation cycle, and perform the alert notification and the automatic steering are performed when a predetermined condition becomes satisfied in a case that the vehicle control apparatus 10 determines that the own vehicle 100 has a probability of colliding with the oncoming vehicle 200.

Therefore, when a predetermined timing is reached, the vehicle control apparatus 10 starts a process from a step S200 of the routine shown in FIG. 2, and proceeds with the process to a step S205 to determine whether or not the own vehicle 100 is travelling. The vehicle control apparatus 10 determines that the own vehicle 100 is traveling when the own vehicle travelling speed V is greater than zero.

When the vehicle control apparatus 10 determines "Yes" at the step S205, the vehicle control apparatus 10 proceeds with the process to a step S210 to determine whether or not a predicted collision period of time Tcol is shorter than a first threshold period of time T1. That is, when the predicted collision period of time Tcol is shorter than the first threshold period of time T1, the vehicle control apparatus 10 determines whether or not there is a probability of the own vehicle 100 colliding with the oncoming vehicle 200.

The predicted collision period of time Tcol is a period of time predictively taken for the own vehicle 100 to collide with the oncoming vehicle 200. For example, in examples shown in FIG. 3A and FIG. 3B, the predicted collision period of time Tcol is the period of time taken for the own vehicle 100 to travel a distance Pcol to a point where the own vehicle 100 is predicted to collide with the oncoming vehicle 200. The vehicle control apparatus 10 calculates and acquires the predicted collision period of time Tcol based on a predicted own vehicle travelling route R1, a predicted oncoming vehicle travelling route R2, the own vehicle travelling speed V, a traveling speed of the oncoming vehicle 200, and the like. Further, the vehicle control apparatus 10 acquires the traveling speed of the oncoming vehicle 200 based on the surrounding detection information IS.

Figure 3A:
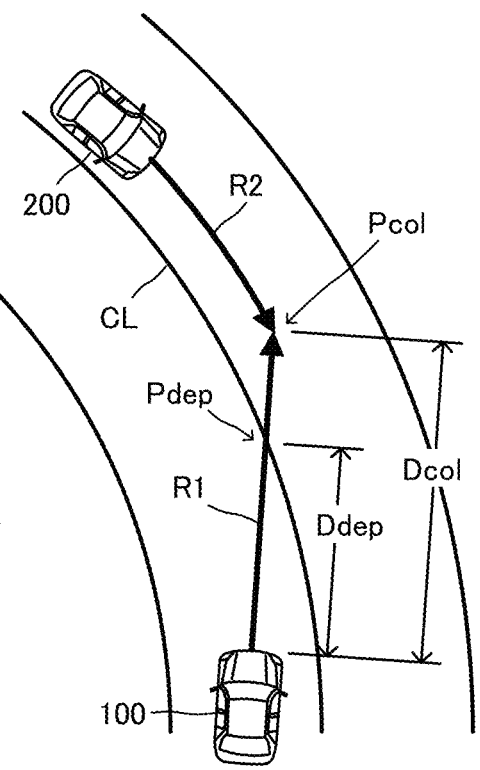
FIG. 3A is a view which shows a scene that an own vehicle has a probability of colliding with an oncoming vehicle immediately after the own vehicle departs from a traffic lane.

Further, as shown in FIG. 3A, the predicted own vehicle travelling route R1 is a route along which the own vehicle 100 is predicted to travel in the future, and the predicted oncoming vehicle travelling route R2 is a route along which the oncoming vehicle 200 is predicted to travel in the future. The vehicle control apparatus 10 acquires the predicted own vehicle travelling route R1 from the steering angle θ of the own vehicle 100 and the like, and acquires the predicted oncoming vehicle travelling route R2 based on the surrounding detection information IS.

It should be noted that the first threshold period of time T1 is a period of time which is appropriately set as a period of time which is appropriate for avoiding the collision of the own vehicle 100 with the oncoming vehicle 200.

When the vehicle control apparatus 10 determines "Yes" at the step S210, the vehicle control apparatus 10 proceeds with the process to a step S215 to determine whether or not a predicted lane departure period of time Tdep is equal to or longer than a second threshold period of time T2. That is, the vehicle control apparatus 10 determines whether or not a period of time taken for the own vehicle 100 to collide with the oncoming vehicle 200 since the own vehicle 100 departs from the traffic lane is short.

The predicted lane departure period of time Tdep is a period of time predictively taken for the own vehicle 100 to depart from the traffic lane. For example, in the cases shown in FIG. 3A and FIG. 3B, the predicted lane departure period of time Tdep is a period of time taken for the own vehicle 100 to travel a distance Pdep to a point where the own vehicle 100 is predicted to depart from the traffic lane.

The vehicle control apparatus 10 calculates and acquires the predicted lane departure period of time Tdep based on the predicted own vehicle travelling route R1, a position of a centerline CL provided on a road on which the own vehicle 100 is traveling, the own vehicle travelling speed V, and the like. The vehicle control apparatus 10 acquires the position of the centerline CL based on the surrounding detection information IS.

It should be noted that the second threshold period of time T2 is a period of time set as appropriate, and is set to a period of time shorter than the first threshold period of time T1.

When the vehicle control apparatus 10 determines "Yes" at the step S215, the vehicle control apparatus 10 proceeds with the process to a step S225 to perform the alert notification. It should be noted that FIG. 3A shows a scene where the vehicle control apparatus 10 determines "Yes" at the step S215.

The alert notification here is a notification for alerting the driver of the own vehicle 100 and the driver of the oncoming vehicle 200 of the probability of the own vehicle 100 colliding with the oncoming vehicle 200. It should be noted that the alert notification may be a notification for alerting only one of the driver of the own vehicle 100 and the driver of the oncoming vehicle 200.

The vehicle control apparatus 10 performs the alert notification to the driver of the own vehicle 100 by outputting the alert sound or the alert announcement from the sound device 61 or displaying the alert image by the displaying device 62.

In addition, the vehicle control apparatus 10 transmits a signal for requesting the alert notification to the oncoming vehicle 200 via the inter-vehicle communication device 50. When a vehicle control apparatus of the oncoming vehicle 200 receives the signal, the vehicle control apparatus of the oncoming vehicle 200 performs the alert notification by outputting the alarm sound or the alert announcement from a sound device of the oncoming vehicle 200 or displaying the alert image by a displaying device of the oncoming vehicle 200.

On the other hand, when the vehicle control apparatus 10 determines "No" at the step S215, the vehicle control apparatus 10 proceeds with the process to a step S220 to determine whether or not the predicted lane departure period of time Tdep becomes shorter than a third threshold period of time T3. That is, the vehicle control apparatus 10 determines whether or not the own vehicle 100 is in a state that the own vehicle 100 is about to depart from the traffic lane.

It should be noted that the third threshold period of time T3 is a period of time appropriately set, and is set to a period of time shorter than the second threshold period of time T2.

Figure 3B:
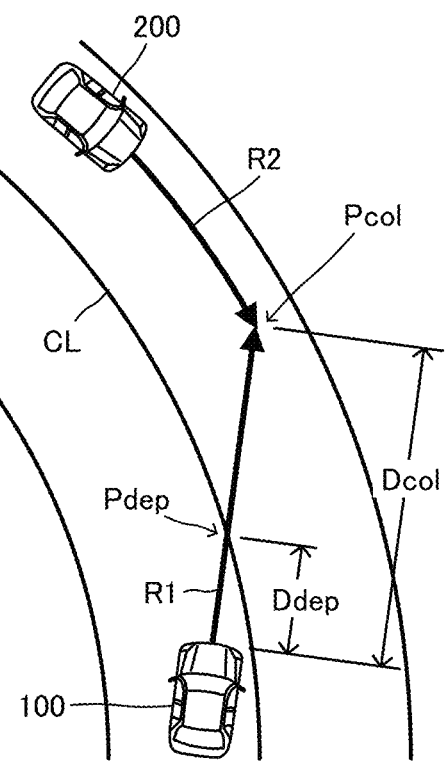
FIG. 3B is a view which shows a scene that the own vehicle is about to depart from the traffic lane.

When the vehicle control apparatus 10 determines "Yes" at the step S220, the vehicle control apparatus 10 proceeds with the process to a step S225 to perform the alert notification to the driver of the own vehicle 100 and the driver of the oncoming vehicle 200 as described above. It should be noted that FIG. 3B shows a scene where the vehicle control apparatus 10 determines "Yes" at the step S220.

After the vehicle control apparatus 10 performs the alert notification at the step S225, the vehicle control apparatus 10 proceeds with the process to a step S230 to determine whether or not an automatic steering condition Cstr is satisfied. In the present embodiment, the automatic steering condition Cstr is a condition that the own vehicle 100 departs from the traffic lane.

When the vehicle control apparatus 10 determines "Yes" at the step S230, the vehicle control apparatus 10 proceeds with the process to a step S235 to perform the automatic steering. As described above, the automatic steering is a process of automatically steering the own vehicle 100 to return the own vehicle 100 into the original traffic lane. Next, the vehicle control apparatus 10 proceeds with the process to a step S295 to terminate executing this routine once.

On the other hand, when the vehicle control apparatus 10 determines "No" at the step S230, the vehicle control apparatus 10 proceeds with the process to a step S245 to stop performing the automatic steering which is being performed. Next, the vehicle control apparatus 10 proceeds with the process to the step S295 to terminate executing this routine once.

Further, when the vehicle control apparatus determines "No" at the step S205, the step S210, or the step S220, the vehicle control apparatus 10 proceeds with the process to a step S240 to stop performing the alert notification which is being performed. Next, the vehicle control apparatus 10 proceeds with the process to a step S245 to stop performing the automatic steering which is being performed. Next, the vehicle control apparatus 10 proceeds with the process to the step S295 to terminate executing this routine once.

The operations of the vehicle control apparatus 10 have been described.

When the period of time predictively taken for the own vehicle 100 to depart from the traffic lane and collide with the oncoming vehicle 200 decreases to a certain period of time, there may be occurred a case that the own vehicle 100 is determined to have a probability of departing from the traffic lane and colliding with the oncoming vehicle 200. In this case, when the period of time taken for the own vehicle 100 to depart from the traffic lane is relatively long, and the period of time taken for the own vehicle 100 to collide with the oncoming vehicle 200 since the own vehicle 100 departs from the traffic lane is relatively long, the driver of the own vehicle 100 or the driver of the oncoming vehicle 200 can relatively easily carry out a suitable driving operation for avoiding a collision of the own vehicle 100 with the oncoming vehicle 200. Therefore, in this case, the alert notification to the driver of the own vehicle 100 or the driver of the oncoming vehicle 200 is not necessary.

On the other hand, when the period of time taken for the own vehicle 100 to collide with the oncoming vehicle 200 since the own vehicle 100 departs from the traffic lane is short, the alert notification should be performed to the driver of the own vehicle 100 or the driver of the oncoming vehicle 200. In addition, when the period of time taken for the own vehicle 100 to depart from the traffic lane is short, the alert notification should be performed to the driver of the own vehicle 100 or the driver of the oncoming vehicle 200.

With the vehicle control apparatus 10, when the predicted lane departure period of time Tdep is equal to or longer than the second threshold period of time T2 at a point of time when the predicted collision period of time Tcol becomes shorter than the first threshold period of time T1, the alert notification is performed. That is, when the period of time taken for the own vehicle 100 to collide with the oncoming vehicle 200 since the own vehicle 100 departs from the traffic lane is short at a point of time when the period of time taken for the own vehicle 100 to collide with the oncoming vehicle 200 decreases to a certain period of time, the alert notification is performed. Thereby, the alert notification can be performed appropriately.

Further, with the vehicle control apparatus 10, the alert notification is performed when the predicted lane departure period of time Tdep becomes shorter than the third threshold period of time T3 in case that the predicted lane departure period of time Tdep is equal to or longer than the third threshold period of time T3 at a point of time when the predicted collision period of time Tcol becomes shorter than the first threshold period of time T1. That is, when the period of time taken for the own vehicle 100 to depart from the traffic lane is short at a point of time when the period of time taken for the own vehicle 100 to collide with the oncoming vehicle 200 decreases to a certain period of time, the alert notification is performed. Thereby, the alert notification can be performed appropriately.

It should be noted that the present invention is not limited to the above-described embodiments, and various modifications can be adopted within the scope of the present invention.

What is claimed is:

1. A vehicle control apparatus comprising an electronic control unit configured to perform an alert notification of alerting an operator of at least one of an own vehicle and an oncoming vehicle of a probability that the own vehicle collides with the oncoming vehicle when the electronic control unit determines that the own vehicle has a probability of colliding with the oncoming vehicle based on a predicted travelling route of the own vehicle and a predicted travelling route of the oncoming vehicle, wherein the electronic control unit is configured to:
perform the alert notification when a predicted lane departure period of time is equal to or longer than a second threshold period of time at a point of time when a predicted collision period of time becomes shorter than a first threshold period of time,
the predicted collision period of time being a period of time taken for the own vehicle to collide with the oncoming vehicle, and the predicted lane departure period of time being a period of time taken for the own vehicle to depart from a traffic lane; and
perform the alert notification when the predicted lane departure period of time becomes shorter than a third threshold period of time shorter than the second threshold period of time in case that the predicted lane departure period of time is shorter than the second threshold period of time at a point of time when the predicted collision period of time becomes shorter than the first threshold period of time.

2. The vehicle control apparatus according to claim 1, wherein the electronic control unit is configured not to perform the alert notification when (i) the predicted collision period of time is shorter than the first threshold period of time, and (ii) the predicted lane departure period of time is shorter than the second threshold period of time and equal to or longer than the third threshold period of time.

3. The vehicle control apparatus according to claim 1, wherein the electronic control unit is configured to perform an automatic steering of returning the own vehicle into the traffic lane by automatically steering the own vehicle when the own vehicle departs from the traffic lane after the electronic control units starts performing the alert notification.

* * * * *